UNITED STATES PATENT OFFICE.

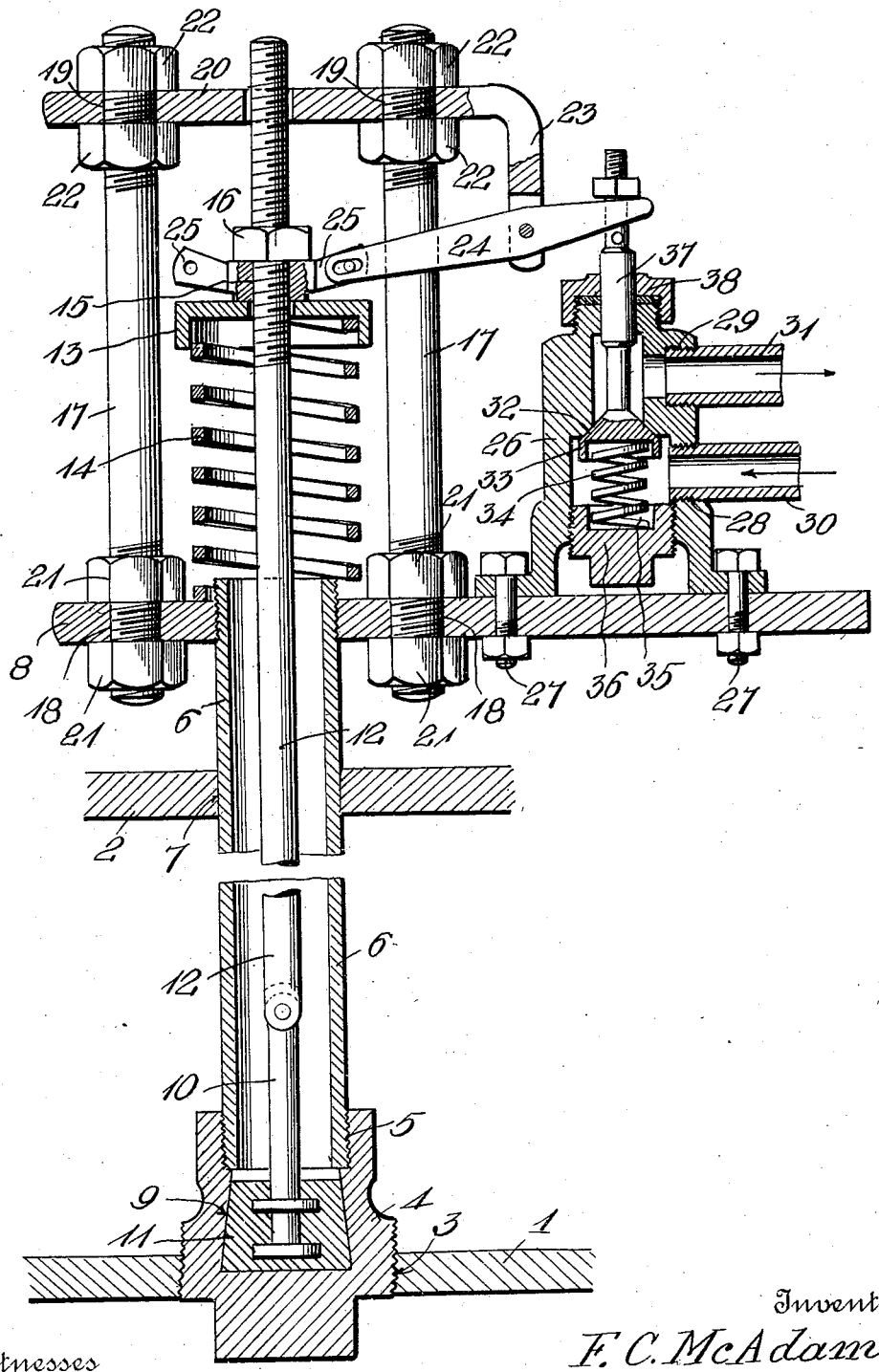

FRED CAMPBELL McADAM, OF LOS ANGELES, CALIFORNIA.

BOILER-ALARM.

937,948.   Specification of Letters Patent.   Patented Oct. 26, 1909.

Application filed July 1, 1909. Serial No. 505,417.

*To all whom it may concern:*

Be it known that I, FRED CAMPBELL MC-ADAM, a citizen of the United States, residing at Los Angeles, in the county of Los Angeles and State of California, have invented certain new and useful Improvements in Boiler-Alarms; and I do declare the following to be a full, clear, and exact description of the invention, such as will enable others skilled in the art to which it appertains to make and use the same.

This invention relates to improvements in boiler alarms.

The object of the invention is to provide a device of this character by means of which an alarm will be sounded and the fuel supply and injector valves automatically closed when the water in the boiler has reached a danger point.

With the foregoing and other objects in view, the invention consists of certain novel features of construction, combination and arrangement of parts, as will be more fully described and particularly pointed out in the appended claims.

In the accompanying drawings, is shown a vertical sectional view of the invention.

Referring more particularly to the drawings, 1 denotes a section of the crown sheet and 2 denotes the section of the boiler shell. In the crown sheet 1, is formed a threaded opening 3 in which is adapted to be screwed a hollow plug 4, the inner end of which is internally threaded, as shown at 5. Adapted to be screwed into the threaded outer end of the plug 5, is a tubular support 6 which projects through an opening 7 in the boiler shell and has screwed on its inner end a valve supporting plate 8.

The inner end of the hollow plug is in the form of a tapered socket 9 with which is engaged the flanged end of the outer portion of a spring holding bar 10, said flanged end of the bar being secured in the socket 9 by a fusible metal filling 11 which is poured into the plug in a liquid state and hardens around the flanged end of the bar 10, thus securely holding the same in the plug until the said metal is again softened or fused by the heat of the crown sheet. The inner portion of the spring holding bar 10 is detachably secured to the outer portion by a bolt 12 and the free end of said outer portion of the bar is threaded and on said threaded end of the bar is loosely arranged a spring clamping plate 13 having a flanged outer edge.

On the bar 10 between the plate 13 and the valve supporting plate 8, is arranged a coiled spring 14. The spring 14 is confined and the tension thereof regulated by means of an interiorly threaded collar 15 and a jam nut 16 which are screwed onto the threaded end of the bar 10 and bear against the clamping plate 13, as shown.

On the plate 8 is arranged a spring cage comprising a series of bolts 17 which are threaded at their opposite ends and are loosely engaged at one end with apertures 18 in the plate 8 and at their opposite ends with apertures 19 in a lever supporting plate 20 which is spaced a suitable distance above the spring 14, as shown. The bolts 17 are secured to the plate 8 by inner and outer clamping nuts 21 which are arranged on the threaded ends thereof and adapted to be screwed into engagement with the opposite sides of the plate 8, as shown. The plate 20 is secured in position on the opposite ends of the bolts by clamping nuts 22 which are screwed on said ends of the bolts and engage the opposite sides of the plate 20, as shown. One end of the plate 20 is turned downwardly as shown at 23, to provide a bearing bracket in which is pivotally mounted a valve operating lever 24, the inner end of which is loosely connected to one of a series of radially projecting wings 25 formed on the collar 15.

Secured to the plate 8 is a valve casing 26, said casing being detachably secured to the plate 8 by bolts 27. In one side of the casing 26, is arranged an inlet port 28 and a discharge port 29. With the port 28 is connected a steam or compressed air conducting tube 30 which leads from the boiler or any other steam or compressed air supply and with the port 29 is connected a steam or air discharge pipe 31 which extends to and may be connected with a whistle or other form of alarm and with the valves of the fuel supply and injectors of the boiler. In the casing 26, between the ports 28 and 29, is arranged a valve seat 32 with which is adapted to be engaged a valve 33. The valve 33 is normally held in closed position against its seat 32 by a coiled spring 34, one end of which bears against the valve, while the opposite end is seated in a recess 35 formed in a plug 36 which is screwed into the lower end of the casing 26, as shown. The valve 33 is provided with an upwardly projecting stem 37 and projects through a stuffing box 38 on the upper end of the valve casing and is loosely and adjustably connected at its upper end with the free end of the lever 24, as shown, whereby when said lever is operated, the valve will be opened to permit the steam or air to pass through the valve casing from the inlet pipe to the outlet or discharge pipe, and thence to the alarm or valves of the boiler.

In the operation of the device, when the water reaches a danger point in the boiler and the crown sheet becomes heated the fusible metal 11 which secures the flanged end of the spring holding bar will be melted or fused and said end of the bar released, thus permitting the spring 14 to expand, thus pushing the bar 10 and collar 15 upwardly which will rock the lever 24 causing the latter to open the valve 33 against the tension of the spring 34, thus permitting the steam or compressed air to pass through the valve casing from the inlet to the discharge pipe by which it is conducted to the alarm or valve operating devices as hereinbefore described.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. In a boiler alarm, a fluid controlling valve, a valve operating spring, a spring holding bar, a spring clamping plate arranged on one end of said bar, a clamping nut and collar having a threaded engagement with said bar, whereby said plate is held in clamped engagement with said spring and the latter held in retracted or inoperative position, a lever connected at one end to said collar and at its opposite end to said valve, and a fusible material adapted to secure said spring holding bar in position to retain said spring in a retracted position.

2. In a boiler alarm, a valve supporting plate, means to attach said plate to a boiler, a valve casing arranged on said plate, a fluid controlling valve in said casing, said valve having a stem, a valve operating spring arranged on said plate, a spring holding bar, a spring clamping plate arranged on said bar, a clamping collar and nut having a threaded engagement with said bar to hold said plate in clamped engagement with said spring, a pivoted lever having a loose connection at one end with said collar and at its opposite end with the stem of the valve, a hollow plug having a screw threaded engagement with a part of the boiler and adapted to receive one end of said spring clamping bar, and a fusible material arranged in said plug to secure said bar when the latter is arranged to hold the spring in a retracted position.

3. In a boiler alarm, a hollow plug adapted to be screwed into engagement with the crown sheet of the boiler, a tubular support having a threaded engagement at one end with said plug, a valve supporting plate adapted to be screwed on the opposite end of said tubular support, a valve casing arranged on said plate, fluid inlet and discharge pipes connected with said casing, a spring closed valve arranged in said casing to cut-off communication between said pipes, a stem arranged on said valve, a valve operating spring, a spring holding bar formed in separable sections, one of which is engaged with said hollow plug, a fusible material arranged in said plug to secure said section of the bar, a clamping plate arranged on the opposite section of the bar to engage said spring, a clamping nut and collar having a threaded engagement with said bar and adapted to clamp said plate against the spring to hold the same in a retracted position, a pivotally mounted lever having a loose connection at one end with said collar, and means to adjustably connect the opposite end of the lever with said valve stem.

In testimony whereof I have hereunto set my hand in presence of two subscribing witnesses.

FRED CAMPBELL McADAM.

Witnesses:
ROGER ENRIGHT,
JOHN P. REGAN.